(12) United States Patent
Miyakawa et al.

(10) Patent No.: US 6,624,861 B2
(45) Date of Patent: *Sep. 23, 2003

(54) COLOR FILTER SUBJECT TO IMPURITY EXTRACTION TREATMENT AND LIQUID CRYSTAL DISPLAY DEVICE HAVING HIGH VOLTAGE HOLDING RATIO

(75) Inventors: Shunji Miyakawa, Tokyo-To (JP); Tomio Tanaka, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/840,973

(22) Filed: Apr. 25, 2001

(65) Prior Publication Data

US 2002/0008813 A1 Jan. 24, 2002

(30) Foreign Application Priority Data

Apr. 26, 2000 (JP) ........................................ 2000-125097

(51) Int. Cl.⁷ ............................................. G02F 1/1335
(52) U.S. Cl. ....................................................... 349/106
(58) Field of Search ............................... 349/107, 108, 349/109

(56) References Cited

U.S. PATENT DOCUMENTS

| 5,035,928 A | 7/1991 | Kozaki et al. ................. 428/1 |
| 5,453,217 A * | 9/1995 | Keneko et al. ........... 252/299.1 |
| 5,757,451 A | 5/1998 | Miyazaki et al. ............ 349/106 |
| 6,046,787 A | 4/2000 | Nishiguchi ................... 349/129 |
| 6,413,686 B2 * | 7/2002 | Kishimoto et al. ............. 430/7 |
| 6,414,733 B1 * | 7/2002 | Ishikawa et al. ............ 349/110 |

FOREIGN PATENT DOCUMENTS

| JP | 09033912 | 2/1997 |
| JP | 09090412 | 4/1997 |

* cited by examiner

*Primary Examiner*—Toan Ton
*Assistant Examiner*—Timothy L Rude
(74) *Attorney, Agent, or Firm*—Parkhurst & Wendel, L.L.P.

(57) ABSTRACT

Disclosed are a color filter, which can prevent, on a higher level, a liquid crystal layer from being contaminated with ionic materials, and a liquid crystal display device having improved display quality. The color filter comprises at least a substrate and a colored layer of a plurality of colors provided in a predetermined pattern on the substrate, and, after impurity elution, permits a liquid crystal to have a voltage holding ratio of not less than 90%. The liquid crystal display device comprises: this color filter; and a counter electrode substrate provided so as to face the color filter while leaving a gap between the color filter and the counter electrode substrate through a seal member; and a liquid crystal layer sealed into the gap.

10 Claims, 4 Drawing Sheets

COLOR FILTER SUBJECT TO IMPURITY EXTRACTION TREATMENT AND LIQUID CRYSTAL DISPLAY DEVICE HAVING HIGH VOLTAGE HOLDING RATIO

TECHNICAL FIELD

The present invention relates to a color filter and a liquid crystal display device, and more particularly to a liquid crystal display device having excellent (improved) display quality and a color filter for use in the liquid crystal display device.

BACKGROUND ART

In recent years, color liquid crystal display devices have drawn attention as flat displays. One example of the color liquid crystal display devices is a transmission liquid crystal display device such that a color filter comprising a black matrix, a colored layer of a plurality of colors (in general, the three primary colors of red (R), green (G), and blue (B)), a common transparent electrode layer, and an aligning layer is provided so as to face a counter electrode substrate comprising a thin film transistor (a TFT device), an pixel electrode, and an aligning layer, while leaving a predetermined gap between the color filter and the counter electrode substrate, and a liquid crystal material is poured into the gap to form a liquid crystal layer. Another example of the color liquid crystal display devices is a reflection liquid crystal display device wherein, in the above color filter, a reflective layer is provided between the substrate and the colored layer.

In these color liquid crystal display devices, a change in the state of alignment of the liquid crystal caused, for example, by an alignment failure of the liquid crystal, a change in voltage applied to the liquid crystal, and a variation in voltage within the display surface, results in the occurrence of display failures (unacceptable display phenomena) which are classified into sticking and white stain (uneven whiteness).

Sticking is a phenomenon such that, when a voltage has been applied to an identical pixel for a given period of time followed by a lowering in voltage or the stop of the application of the voltage, the transmittance of this pixel becomes different from the transmittance of pixels, located around this pixel, to which the voltage has not been applied for the given period of time, and, as a result, an uneven display is visually perceived and is continued even after standing for a long period of time. In the sticking phenomenon of normally white panels, the pixel, to which a voltage has been applied for a given period of time, is seen more darkly than pixels located around this pixel. This sticking phenomenon is attributable to the fact that an ionic material is deposited on an electrode during the application of the voltage and, after the stop of the application of the voltage, remains adsorbed on the electrode and, as a result, the voltage derived from the ionic material continues to act on the liquid crystal.

On the other hand, uneven whiteness is a phenomenon such that an uneven display is visually perceived due to the fact that, when a voltage is applied to display a black screen, the transmittance does not become zero in a part of the display region. The cause of this phenomenon is considered as follows. Although the voltage applied across the electrodes should be kept constant, when an ionic material is present in the liquid crystal, this ionic material is moved, that is, a current flows, resulting in a drop of voltage across the electrodes.

It is considered that the above-described ionic material causative of display failure phenomena does not stay on the electrode and easily migrates within the liquid crystal layer. Various sources are considered for the ionic material, and the control of impurities contained, for example, in liquid chemicals, air, and pure water used in the production process of liquid crystal display devices, the control of dust generated, for example, from apparatuses and human body, and the optimization of process conditions are carried out in order to prevent the occurrence of display failures. Further, surface cleaning of color filters and counter electrode substrates and the removal of impurities, such as residues produced, for example, from ultraviolet irradiation and surface polishing in the production process of liquid crystal display devices, are also carried out.

These measures can reduce display failure phenomena. In display under severe conditions, such as display for a long period of time or display under high temperature and high humidity conditions, however, the probability of occurrence of display failures is still high.

Further, in recent years, efforts are being directed toward a lowering in drive voltage to realize low power consumption of color liquid crystal display devices. In order to realize the low voltage drive, it is necessary to set at a low value the threshold voltage of liquid crystals used. This has led to studies on liquid crystal display devices using liquid crystals having high permittivity anisotropy $\Delta\epsilon$ of liquid crystals. In general, however, the polarity of liquid crystals is likely to increase with increasing the permittivity anisotropy $\Delta\epsilon$. Therefore, impurities are likely to be eluted from a color filter or a counter electrode substrate in contact with the liquid crystal into the liquid crystal. This is likely to cause the above-described display failures.

Under these circumstances, the present invention has been made, and it is an object of the present invention to provide a color filter, which can prevent, on a higher level, a liquid crystal layer from being contaminated with ionic materials, and a liquid crystal display device having improved display quality.

DISCLOSURE OF THE INVENTION

The present inventors have considered that members in contact with a liquid crystal layer in a liquid crystal display device are one of sources for the above-described ionic material and have directed attention, as properties having a correlation with display failures caused by ionic materials which have migrated from the member constituting a color filter or a liquid crystal display device into the liquid crystal layer, to the influence of a color filter or the like after impurity elution on the voltage holding ratio of the liquid crystal. This has led to the completion of the present invention.

Specifically, in order to attain the above object, according to one aspect of the present invention, there is provided a color filter comprising at least a substrate and a colored layer of a plurality of colors provided in a predetermined pattern on the substrate, wherein, after impurity elution, the color filter permits a liquid crystal to have a voltage holding ratio of not less than 90%.

Preferably, the color filter of the present invention further comprises a light shielding layer provided in a predetermined pattern.

Preferably, the color filter according to the present invention further comprises a transparent protective layer provided on the colored layer so as to cover at least the colored layer.

In this case, preferably, a transparent columnar convex is provided in a plurality of predetermined sites on the substrate so as to be protruded from the transparent protective layer.

Preferably, the color filter according to the present invention, a reflective layer is provided between the substrate and the colored layer.

According to another aspect of the invention, there are provided the following first to fifth liquid crystal display devices.

The first liquid crystal display device according to the present invention comprises: a color filter; a counter electrode substrate provided so as to face the color filter while leaving a gap between the color filter and the counter electrode substrate through a seal member; and a liquid crystal layer sealed into the gap, said color filter comprising a common transparent electrode layer provided in any one of the above color filters.

The second liquid crystal display device according to the present invention comprises: a color filter; a counter electrode substrate provided so as to face the color filter while leaving a gap between the color filter and the counter electrode substrate through a seal member; and a liquid crystal layer sealed into the gap, said color filter comprising a common transparent electrode layer provided in any one of the above color filters, said counter electrode substrate being such that a semiconductor drive element having a resin light shielding layer is provided and, after impurity elution, the counter electrode substrate permits a liquid crystal to have a voltage holding ratio of not less than 90%.

The third liquid crystal display device according to the present invention comprises: a color filter; a counter electrode substrate provided so as to face the color filter while leaving a gap between the color filter and the counter electrode substrate through a seal member; and a liquid crystal layer sealed into the gap, said color filter comprising a common transparent electrode layer provided in any one of the above color filters, said counter electrode substrate being such that a semiconductor drive element having columnar convexes is provided and, after impurity elution, the counter electrode substrate permits a liquid crystal to have a voltage holding ratio of not less than 90%.

The fourth liquid crystal display device according to the present invention comprises: a common electrode substrate; a counter electrode substrate provided so as to face the common electrode substrate while leaving a gap between the common electrode substrate and the counter electrode substrate through a seal member; and a liquid crystal layer sealed into the gap, wherein said common electrode substrate comprises a substrate and a common transparent electrode layer provided on the substrate, and said counter electrode substrate comprises semiconductor drive elements and a colored layer of a plurality of colors provided in a predetermined pattern according to the semiconductor drive elements, and, after impurity elution, permits a liquid crystal to have a voltage holding ratio of not less than 90%.

The fifth liquid crystal display device according to the present invention comprises: a common electrode substrate; a counter electrode substrate provided so as to face the common electrode substrate while leaving a gap between the common electrode substrate and the counter electrode substrate through a seal member; and a liquid crystal layer sealed into the gap, wherein said common electrode substrate comprises a substrate and a common transparent electrode layer provided on the substrate, and said counter electrode substrate comprises a substrate and, provided on the substrate in the following order, a drive element layer, a reflective electrode layer, and a colored layer of a plurality of colors, and, after impurity elution, permits a liquid crystal to have a voltage holding ratio of not less than 90%.

BRIEF DESCRIPTION OF THE DRAWINGS

The invention will be explained in more detail in conjunction with the appended drawings, wherein.

BEST MODE FOR CARRYING OUT THE INVENTION

The best mode for carrying out the present invention will be described with reference to the accompanying drawings.

Color Filter

First Embodiment of Color Filter

Figure 1:
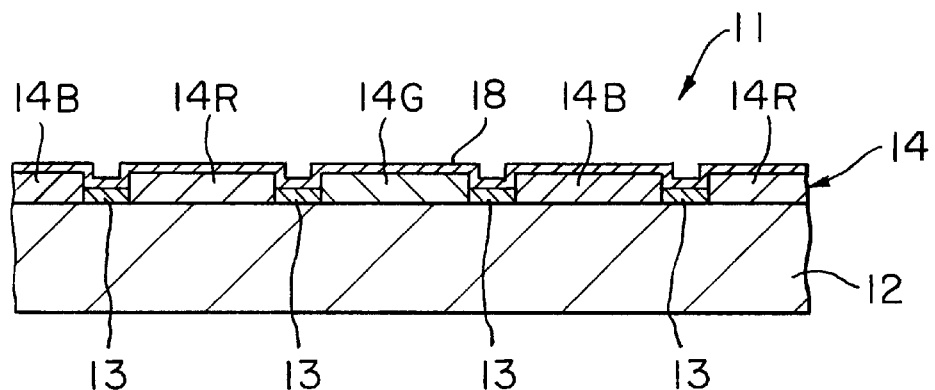
FIG. 1 is a schematic cross-sectional view showing one embodiment of the color filter according to the present invention.

FIG. 1 is a schematic cross-sectional view showing a first preferred embodiment of the color filter according to the present invention. In FIG. 1, a color filter 11 according to the present invention comprises: a substrate 12; a black matrix 13 provided on the substrate 12; a colored layer 14 provided on the substrate 12 in its sites where the black matrix 13 has not been provided; and a common transparent electrode layer 18. This color filter 11 is used in a liquid crystal display device in such a state that an aligning layer is provided on the common transparent electrode layer 18. The present inventors have considered that members constituting the color filter are one of sources for impurities, such as ionic materials, and have directed attention, as properties having a correlation with display failures caused by impurities which have migrated from the color filter into the liquid crystal layer in a liquid crystal display device, to the influence of the color filter after impurity elution on the voltage holding ratio of the liquid crystal.

Specifically, according to the present invention, in order to prevent the occurrence of display failures, such as uneven whiteness and sticking, the color filter after impurity elution should permit a liquid crystal to have a voltage holding ratio of not less than 90%, preferably not less than 95%. The color filter satisfying this requirement, when used in liquid crystal display devices, hardly causes the elution of impurities, such as ionic materials, into the liquid crystal, and, even under severe display conditions, such as in the case of display for a long period of time or in the case of display under high temperature and high humidity conditions, can prevent the occurrence of display failures, such as sticking and uneven whiteness, and thus can realize liquid crystal display devices having excellent display quality.

According to the present invention, the impurity elution is carried out under severe conditions which facilitate the elution of ionic materials, that is, using a highly polar solvent. Further, the influence of the color filter after the impurity elution on the voltage holding ratio of the liquid crystal is measured under the following conditions.

Impurity Elution

N-Methylpyrrolidone (NMP) is coated as a polar solvent at a coverage of 0.01 mg to 10 mg/cm$^2$ on the common transparent electrode layer in the color filter. The color filter is then heated at 40 to 250° C. to evaporate NMP, whereby the eluted material is left on the color filter. In the case of a color filter not provided with a common transparent electrode layer, the common transparent electrode layer is formed on the color filter followed by the impurity elution.

Conditions for Measurement of Voltage Holding Ratio

A measurement cell having a layer construction of color filter/liquid crystal/electrode/substrate is prepared using the color filter after the impurity elution. A liquid crystal is poured into the measurement cell, followed by the measurement of the voltage holding ratio under the following conditions. The liquid crystal used is such that the liquid crystal, when poured into a measurement cell having a layer construction of substrate/electrode/liquid crystal/electrode/substrate, has a voltage holding ratio of not less than 95% as measured under the following conditions.

Electrode-electrode distance: 5 to 15 μm

Pulse amplitude of applied voltage: 5 V

Pulse frequency of applied voltage: 60 Hz

Pulse width of applied voltage: 16.67 msec

When the color filter 11 is used in liquid crystal display devices in such a state that, as described above, an aligning layer is provided on the common transparent electrode layer 18. The thickness of the aligning layer is generally as small as 0.01 to 1 μm, and, thus, the aligning layer is not substantially expected to have the function of blocking impurities. Therefore, the impurity elution and the measurement of voltage holding ratio are simply carried out without the provision of the aligning layer.

The substrate 12 constituting the color filter 11 may be formed of a nonflexible transparent rigid material, such as quartz glass, Pyrex glass, or a synthetic quartz plate, or a transparent flexible material, such as a transparent resin film or an optical resin plate. Among others, 7059 glass manufactured by Corning is particularly suitable for use in a color filter for color liquid crystal display devices of active matrix system, because this glass has a low coefficient of thermal expansion, has excellent dimensional stability and workability in high-temperature heat treatment, and is an alkali-free glass, that is, does not contain any alkali component.

The black matrix 13 constituting the color filter 11 is provided between display pixels formed of the colored layer 14 and is provided outside the region where the colored layer 14 is provided. This black matrix 13 may be any one, and examples thereof include a black matrix formed by forming a resin layer containing light shielding particles such as fine particles of carbon and patterning the resin layer, and a black matrix formed by forming a photosensitive resin layer containing light shielding particles, such as fine particles of carbon or a metal oxide, and then patterning the photosensitive resin layer.

In order to prevent the black matrix 13 from functioning as a source for impurities such as ionic materials and thus to enable the color filter 11 after impurity elution to permit a liquid crystal to have a voltage holding ratio of not less than 90%, for example, the amount of the polymerization initiator used in the formation of the black matrix 13, post-baking conditions, and post-exposure after the completion of exposure for patterning are preferably regulated to enhance the degree of crosslinking of the resin.

In the present invention, the color filter 11 may not be provided with the black matrix 13. In this case, at sites where the colored layer 14 has not been formed, the substrate 12 may be exposed. Alternatively, the colored layer 14 may be formed so as to cover the substrate 12.

The colored layer 14 constituting the color filter 11 is formed of a red pattern 14R, a green pattern 14G, and a blue pattern 14B arranged in a desired pattern form, and may be formed by a pigment dispersion method using photosensitive resins respectively containing desired colorants, or by a conventional method such as printing or transfer. In order to prevent the colored layer 14 from functioning as a source for impurities such as ionic materials and thus to enable the color filter 11 after impurity elution to permit a liquid crystal to have a voltage holding ratio of not less than 90%, for example, the amount of the polymerization initiator used in the formation of the colored layer 14, post-baking conditions, and post-exposure after the completion of exposure for patterning are preferably regulated to enhance the degree of crosslinking of the resin.

The colored layer 14 may be formed in such a manner that, for example, the thickness is increased in the order of the red pattern 14R (smallest thickness), the green pattern 14G, and the blue pattern 14B (largest thickness). This permits the optimal liquid crystal layer thickness to be set for each color in the colored layer 14.

The common transparent electrode layer 18 constituting the color filter 11 may be formed by a conventional film forming method, such as sputtering, vacuum deposition, or CVD, for example, using indium tin oxide (ITO), zinc oxide (ZnO), tin oxide (SnO), or an alloy of metals constituting these oxides. The thickness of the electrode layer is about 0.01 to 1 μm which is not substantially expected to block the migration of impurities, derived from a member located outside this layer, into the liquid crystal layer. The color filter according to the present invention may not be provided with the common transparent electrode layer.

Figure 2:
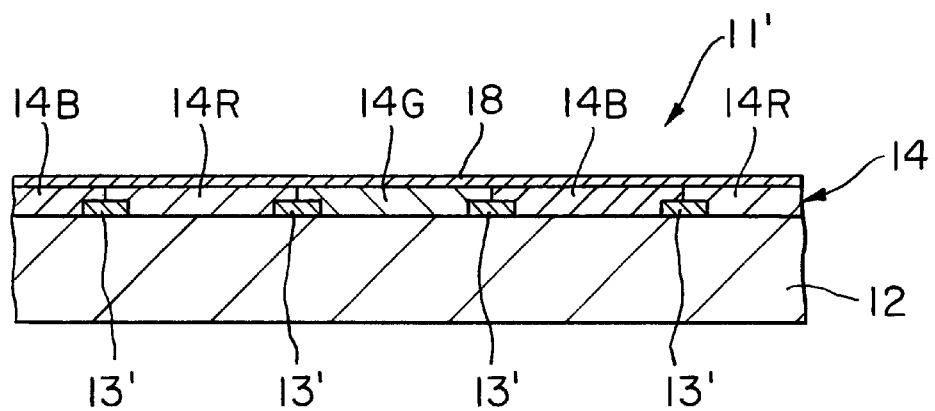
FIG. 2 is a schematic cross-sectional view showing another embodiment of the color filter according to the present invention.

FIG. 2 is a schematic cross-sectional view showing a variant of the above-described first embodiment. The construction of a color filter 11', shown in FIG. 2, according to the present invention is the same as that of the color filter 11, except that a black matrix 13' is covered with the colored layer 14.

The substrate 12 constituting the color filter 11' may be the same as the substrate 12 constituting the color filter 11.

The black matrix 13' constituting the color filter 11' may be any one, and examples thereof include: a black matrix formed by forming an about 1000 to 2000 Å-thick thin layer of a metal, such as chromium, for example, by sputtering or vacuum deposition and then patterning the thin layer; a black matrix formed by forming a layer of a resin, such as a polyimide resin, an acrylic resin, or an epoxy resin, containing light shielding particles, such as fine particles of carbon, and then patterning the resin layer; and a black matrix formed by forming a photosensitive resin layer containing light shielding particles, such as fine particles of carbon or a metal oxide, and patterning the photosensitive resin layer.

The colored layer 14 constituting the color filter 11' may be formed in the same manner as described above in connection with the colored layer 14 in the color filter 11. In order to prevent the colored layer 14 from functioning as a source for impurities such as ionic materials and thus to enable the color filter 11' after impurity elution to permit a liquid crystal to have a voltage holding ratio of not less than 90%, for example, the amount of the polymerization initiator used in the formation of the colored layer 14, post-baking conditions, and post-exposure after the completion of exposure for patterning are preferably regulated to enhance the degree of crosslinking of the resin.

Since the black matrix 13' is covered with the colored layer 14, as described above, enhancing the degree of crosslinking of the resin in the colored layer 14 to prevent the occurrence of impurities, such as ionic materials, enables the color filter 11' after impurity elution to permit the liquid crystal to have a voltage holding ratio of not less than 90%, even though the black matrix 13' is a source for impurities. It is a matter of course that, as with the black matrix 13, for the black matrix 13', the degree of crosslinking of the resin may be enhanced to prevent the occurrence of impurities, such as ionic materials.

Second Embodiment of Color Filter

Figure 3:
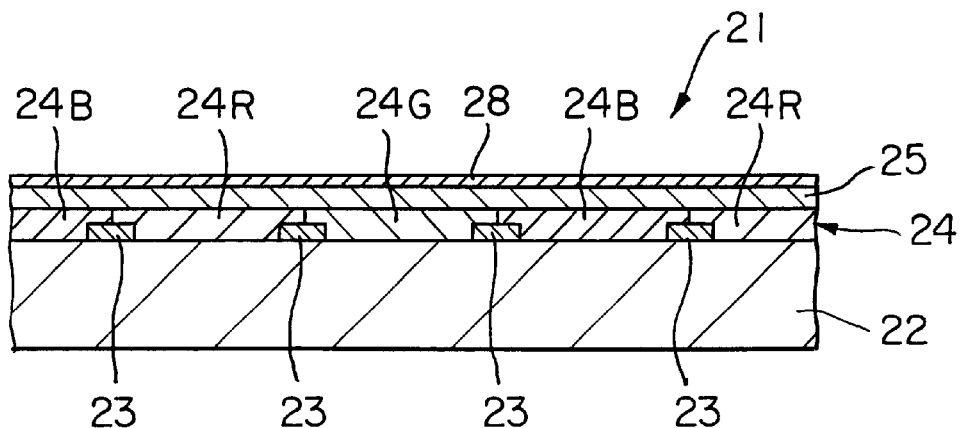
FIG. 3 is a schematic cross-sectional view showing still another embodiment of the color filter according to the present invention.

FIG. 3 is a schematic cross-sectional view showing a second preferred embodiment of the color filter according to the present invention. In FIG. 3, a color filter 21 according to the present invention comprises: a substrate 22 and, provided on the substrate 22, a black matrix 23 and a colored layer 24. A transparent protective layer 25 and a common transparent electrode layer 28 are stacked so as to cover the black matrix 23 and the colored layer 24.

This color filter 21 is used in liquid crystal display devices in such a state that an aligning layer is provided on the common transparent electrode layer 28. The color filter 21 after impurity elution permits a liquid crystal to have a voltage holding ratio of not less than 90%, preferably not less than 95%. As with the color filter 11 described above, the color filter 21, when used in liquid crystal display devices, can prevent the occurrence of display failures, such as sticking and uneven whiteness, even under severe display conditions, such as in the case of display for a long period of time or in the case of display under high temperature and high humidity conditions, and thus can realize liquid crystal display devices having excellent display quality.

The substrate 22 constituting the color filter 21 may be the same as the substrate 12 constituting the color filter 11.

The black matrix 23 constituting the color filter 21 may be any one, and examples thereof include: a black matrix formed by forming an about 1000 to 2000 Å-thick thin layer of a metal, such as chromium, for example, by sputtering or vacuum deposition and then patterning the thin layer; a black matrix formed by forming a layer of a resin, such as a polyimide resin, an acrylic resin, or an epoxy resin, containing light shielding particles, such as fine particles of carbon, and then patterning the resin layer; and a black matrix formed by forming a photosensitive resin layer containing light shielding particles, such as fine particles of carbon or a metal oxide, and patterning the photosensitive resin layer.

In the present invention, the color filter 21 may not be provided with the black matrix 23.

The colored layer 24 is formed of a red pattern 24R, a green pattern 24G, and a blue pattern 24B arranged in a desired pattern form, and may be formed by a pigment dispersion method using photosensitive resins respectively containing desired colorants, or by a conventional method such as printing, electrodeposition, or transfer. The colored layer 24 may be formed in such a manner that, for example, the thickness is increased in the order of the red pattern 24R (smallest thickness), the green pattern 24G, and the blue pattern 24B (largest thickness). This permits the optimal liquid crystal layer thickness to be set for each color in the colored layer 24.

The transparent protective layer 25 functions to flatten the surface of the color filter 21 and, at the same time, to prevent the elution of ingredients contained in the colored layer 24 into the liquid crystal layer. In order that, when the color filter 21 is used in a liquid crystal display device, the black matrix 23 and the colored layer 24 do not come into contact with the liquid crystal layer, the transparent protective layer 25 is provided so as to cover at least the black matrix 23 and the colored layer 24. This transparent protective layer 25 may be formed of a resin material, such as an acrylic copolymer. In order to prevent the transparent protective layer 25 from functioning as a source for impurities such as ionic materials and thus to enable the color filter 21 after impurity elution to permit a liquid crystal to have a voltage holding ratio of not less than 90%, for example, the amount of the polymerization initiator used in the formation of transparent protective layer 25, post-baking conditions, and post-exposure after the completion of exposure for patterning are preferably regulated to enhance the degree of crosslinking of the resin. The thickness of the transparent protective layer 25 can be set by taking into consideration, for example, the light transmittance of the material used and the surface state of the color filter 21, and, for example, may be 0.1 to 3.0 $\mu$m.

Since the black matrix 23 and the colored layer 24 are covered with the transparent protective layer 25, as described above, enhancing the degree of crosslinking of the resin in the transparent protective layer 25 to prevent the occurrence of impurities, such as ionic materials, enables the color filter 21 after impurity elution to permit the liquid crystal to have a voltage holding ratio of not less than 90%, even though the black matrix 23 and the colored layer 24 are a source for impurities. It is a matter of course that, also for black matrix 23 and the colored layer 24, the degree of crosslinking of the resin may be enhanced to prevent the occurrence of impurities, such as ionic materials.

The common transparent electrode layer 28 constituting the color filter 21 may be formed in the same manner as used in the formation of the common transparent electrode layer 18 constituting the color filter 11. The color filter according to the present invention may not be provided with the common transparent electrode layer.

Third Embodiment of Color Filter

Figure 4:
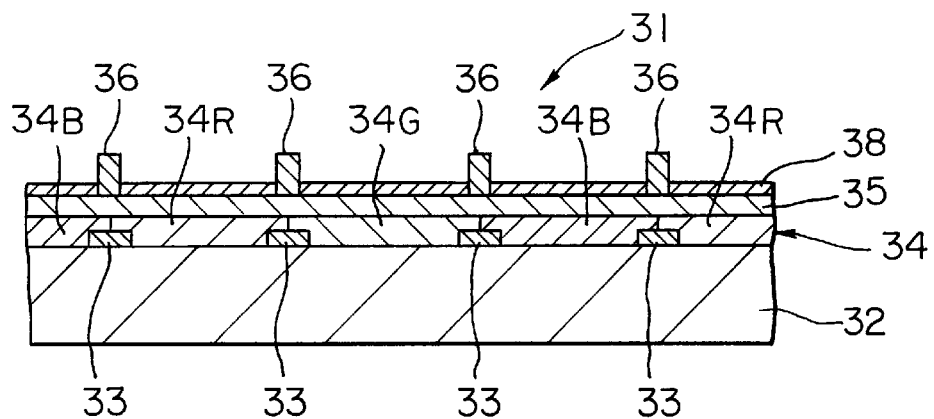
FIG. 4 is a schematic cross-sectional view showing a further embodiment of the color filter according to the present invention.

FIG. 4 is a schematic cross-sectional view showing a third preferred embodiment of the color filter according to the present invention. In FIG. 4, a color filter 31 according to the present invention comprises: a substrate 32 and, provided on the substrate 32, a black matrix 33 and a colored layer 34. A transparent protective layer 35 is provided so as to cover the black matrix 33 and the colored layer 34. Further, a transparent columnar convex 36 is provided at a plurality of predetermined sites corresponding to the black matrix 33 so as to protrude from the transparent protective layer 35. Further, a common transparent electrode layer 38 is provided on the transparent protective layer 35.

This color filter 31 is used in liquid crystal display devices in such a state that an aligning layer is provided on the common transparent electrode layer 38. The color filter 31 after impurity elution permits a liquid crystal to have a voltage holding ratio of not less than 90%, preferably not less than 95%. As with the color filter 11 described above, the color filter 31, when used in liquid crystal display devices, can prevent the occurrence of display failures, such as sticking and uneven whiteness, even under severe display conditions, such as in the case of display for a long period of time or in the case of display under high temperature and high humidity conditions, and thus can realize liquid crystal display devices having excellent display quality.

The substrate 32 constituting the color filter 31 may be the same as the substrate 12 constituting the color filter 11.

The black matrix 33 and the colored layer 34 constituting the color filter 31 may be respectively the same as the black matrix 23 and the colored layer 24 constituting the color filter 21. The color filter 31 may not be provided with the black matrix 33.

Further, the transparent protective layer 35 constituting the color filter 31 may be the same as the transparent protective layer 25 constituting the color filter 21.

The columnar convex 36 constituting the color filter 31, when the color filter 31 is laminated onto a counter electrode substrate, functions as a spacer. The columnar convex 36 may be formed, for example, by coating a photosensitive resin coating composition, subjecting the coating to predetermined pattern exposure, developing the exposed coating, and curing the developed coating. The columnar convex 36 has a given height such that is protruded by about 2 to 10 μm from the transparent protective layer 35. The protrusion level may be properly determined, for example, from thickness required in the liquid crystal layer of the liquid crystal display device. Further, the formation density of the columnar convex 36 may be properly determined by taking into consideration, for example, the unevenness of thickness of the liquid crystal layer, the numerical aperture, the shape of the columnar convex 36, and the material. A necessary and sufficient spacer function can be developed, for example, by providing one columnar convex 36 for each set of the red pattern 34R, the green pattern 34G, and the blue pattern 34B constituting the colored layer 34. The shape of the columnar convex 36 is not particularly limited, and examples thereof include cylindrical, prismatical, and flat-head conical shapes.

The columnar convex 36 may be formed of a resin material, such as an acrylic copolymer. In order to prevent the columnar convex 36 from functioning as a source for impurities such as ionic materials and thus to enable the color filter 31 after impurity elution to permit a liquid crystal to have a voltage holding ratio of not less than 90%, for example, the amount of the polymerization initiator used in the formation of the columnar convex 36, post-baking conditions, and post-exposure after the completion of exposure for patterning are preferably regulated to enhance the degree of crosslinking of the resin.

The common transparent electrode layer 38 constituting the color filter 31 may be formed in the same manner as used in the formation of the common transparent electrode layer 18 constituting the color filter 11. The color filter according to the present invention may not be provided with the common transparent electrode layer.

Fourth Embodiment of Color Filter

Figure 5:
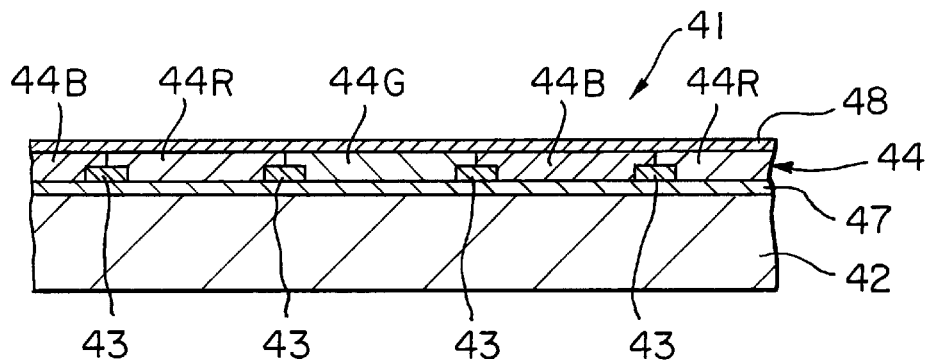
FIG. 5 is a schematic cross-sectional view showing a still further embodiment of the color filter according to the present invention.

FIG. 5 is a schematic cross-sectional view showing a fourth preferred embodiment of the color filter according to the present invention. In FIG. 5, a color filter 41 according to the present invention comprises: a substrate 42; a black matrix 43 provided on the substrate 42 through a reflection layer 47; a colored layer 44 provided on the reflection layer at its sites where the black matrix 43 has not been formed; and a common transparent electrode layer 48.

This color filter 41 is used in liquid crystal display devices in such a state that an aligning layer is provided on the common transparent electrode layer 48. The color filter 41 after impurity elution permits a liquid crystal to have a voltage holding ratio of not less than 90%, preferably not less than 95%. As with the color filter 11 described above, the color filter 41, when used in liquid crystal display devices, can prevent the occurrence of display failures, such as sticking and uneven whiteness, even under severe display conditions, such as in the case of display for a long period of time or in the case of display under high temperature and high humidity conditions, and thus can realize liquid crystal display devices having excellent display quality.

The substrate 42 constituting the color filter 41 may be the same as the substrate 12 constituting the color filter 11.

The black matrix 43 constituting the color filter 41 are covered with the colored layer 44, and may be the same as the black matrix 13' constituting the color filter 11'. The color filter 41 may not be provided with the black matrix 43.

The colored layer 44 constituting the color filter 41 may be the same as the colored layer 14 constituting the color filters 11, 11'. Specifically, in order to prevent the colored layer 44 from functioning as a source for impurities such as ionic materials and thus to enable the color filter 41 after impurity elution to permit a liquid crystal to have a voltage holding ratio of not less than 90%, for example, the amount of the polymerization initiator used in the formation of the colored layer 44, post-baking conditions, and post-exposure after the completion of exposure for patterning are preferably regulated to enhance the degree of crosslinking of the resin.

Since the black matrix 43 is covered with the colored layer 44, as described above, enhancing the degree of crosslinking of the resin in the colored layer 44 to prevent the occurrence of impurities, such as ionic materials, enables the color filter 41 after impurity elution to permit the liquid crystal to have a voltage holding ratio of not less than 90%, even though the black matrix 43 is a source for impurities. It is a matter of course that, also for the black matrix 43, the degree of crosslinking of the resin may be enhanced to prevent the occurrence of impurities, such as ionic materials.

The reflection layer 47 constituting the color filter 41 may be prepared by forming a thin layer of a metal, such as aluminum, by conventional film forming means, such as vapor deposition or sputtering.

The common transparent electrode layer 48 constituting the color filter 41 may be formed in the same manner as used in the common transparent electrode layer 18 constituting the color filter 11. The color filter of the present invention may not be provided with the common transparent electrode layer.

Liquid Crystal Display Device

Next, the liquid crystal display devices according to the present invention will be described.

First Liquid Crystal Display Device According to Present Invention

Figure 6:
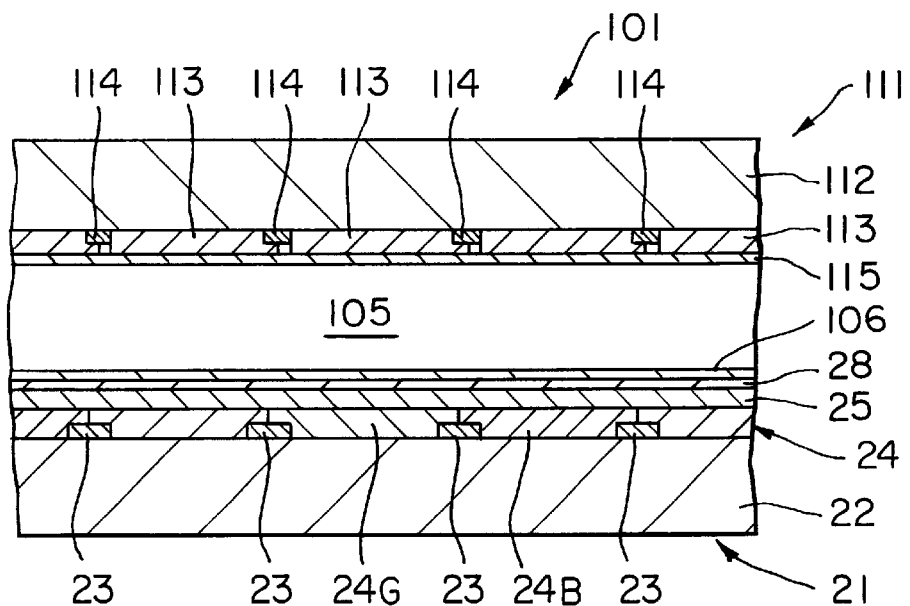
FIG. 6 is a schematic cross-sectional view showing one embodiment of the liquid crystal display device according to the present invention.

FIG. 6 is a schematic cross-sectional view showing one embodiment of the first liquid crystal display device according to the present invention. In FIG. 6, a liquid crystal display device 101 is a transmission liquid crystal display device comprising: a color filter 21; a counter electrode substrate 111 provided so as to face the color filter 21 while leaving a predetermined gap between the color filter 21 and the counter electrode substrate 111; a seal member (not shown) for sealing the periphery of the device; and a liquid crystal layer 105 provided in the gap. A polarizing plate (not shown) is provided outside each of the color filter 21 and the counter electrode substrate 111.

The color filter 21 constituting the liquid crystal display device 101 according to the present invention is the color filter 21 according to the present invention. Therefore, the color filter 21 comprises a substrate 22 and, provided on the substrate 22, a black matrix 23 and a colored layer 24. A transparent protective layer 25 and a common transparent electrode layer 28 are stacked so as to cover the black matrix 23 and the colored layer 24. The color filter 21 after impurity elution permits a liquid crystal to have a voltage holding ratio of not less than 90%, preferably not less than 95%. An aligning layer 106 is provided on the common transparent electrode layer 28 for the drive of the liquid crystal in the color filter 21.

On the other hand, the counter electrode substrate 111 constituting the liquid crystal display device 101 according to the present invention comprises: a transparent substrate 112 and, provided on the transparent substrate 112, a transparent pixel electrode 113 for the drive of a liquid crystal and a thin film transistor (TFT) 114, and an aligning layer 115 is provided so as to cover the transparent pixel electrode 113. A group of gate lines (not shown) for opening/closing the thin film transistor (TFT) 114, a group of signal lines (not shown) for supplying an image signal, and a supply line (not shown) for supplying voltage to the common transparent electrode layer 28 on the color filter 21 side are provided in the counter electrode substrate 111. These leads are made of a metal, such as aluminum, and are generally formed at a time in the production process of the thin film transistor (TFT) 114.

The transparent substrate 112 constituting the counter electrode substrate 111 may be the above-described substrate 12 for the color filter.

The transparent pixel electrode layer 113 constituting the liquid crystal display device 101 may be formed by a conventional film forming method, such as sputtering, vacuum deposition, or CVD, for example, using indium tin oxide (ITO), zinc oxide (ZnO), tin oxide (SnO), or an alloy of metals constituting these oxides. The thickness of the transparent pixel electrode layer 113 and the thickness of the common transparent electrode layer 28 in the color filter 21 are about 0.01 to 1 $\mu$m which is not substantially expected to block the migration of impurities, derived from a member located outside this layer, into the liquid crystal layer 105.

The aligning layers 106, 115 constituting the liquid crystal display device 101 may be formed of an organic compound, and examples of organic compounds usable herein include polyimide compounds, polyamide compounds, polyurethane compounds, and polyurea compounds. The thickness of the aligning layers 106, 115 may be about 0.01 to 1 $\mu$m. In these aligning layers 106, 115, after coating by various printing methods or conventional coating methods, baking is carried out followed by alignment (rubbing). Even when a polar solvent is used in the formation of the aligning layer, impurities such as ionic materials are hardly eluted into the liquid crystal layer, because the color filter 21 of the present invention is used in the liquid crystal display device 101 of the present invention.

In the aligning layers 106, 115 formed of the above organic compound, the thickness is so small that there is no need to consider the migration of impurities causative of display failures into the liquid crystal layer 105. Further, these aligning layers 106, 115 are not substantially expected to block the migration of impurities, derived from a member located outside this layer, into the liquid crystal layer 105.

The liquid crystal layer 105 constituting the liquid crystal display device 101 may be formed of a liquid crystal having a voltage holding ratio of not less than 95% as measured under the above-described conditions for the measurement of the voltage holding ratio.

In this liquid crystal display device 101 according to the present invention, the color filter 21 even after impurity elution permits a liquid crystal to have a voltage holding ratio of not less than 90%, preferably not less than 95%. By virtue of this, the liquid crystal display device 101 can prevent the occurrence of display failures, such as sticking and uneven whiteness, even under severe display conditions, such as in the case of display for a long period of time or in the case of display under high temperature and high humidity conditions, and thus has excellent display quality.

In the liquid crystal display device 101, the color filter is the color filter 21 of the present invention. Likewise, the use of the color filters 11, 11', 31 according to the present invention can provide transmission liquid crystal display devices.

When the color filter 41 according to the present invention is used as the color filter, a reflection liquid crystal display device can be provided. In this case, a phase difference plate and a polarizing plate are provided outside the counter electrode substrate 111 on the viewer side.

Second Liquid Crystal Display Device of Present Invention

Figure 7:
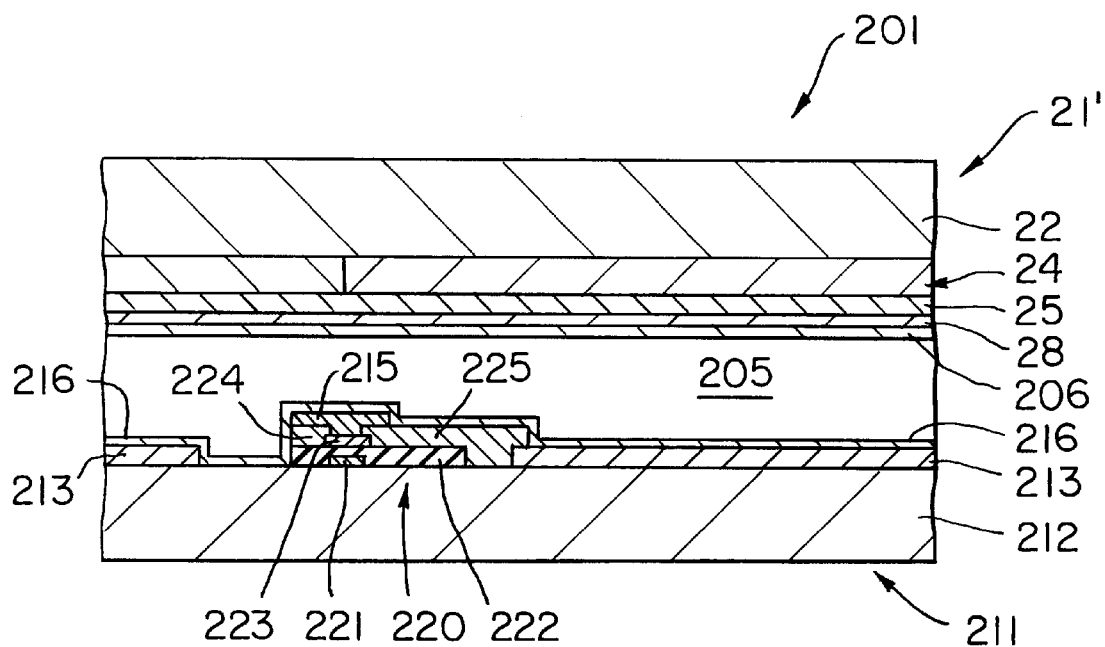
FIG. 7 is a schematic cross-sectional view showing another embodiment of the liquid crystal display device according to the present invention.

FIG. 7 is a schematic cross-sectional view showing one embodiment of the second liquid crystal display device according to the present invention. In FIG. 7, a liquid crystal display device 201 is a transmission liquid crystal display device comprising: a color filter 21'; a counter electrode substrate 211 provided so as to face the color filter 21' while leaving a predetermined gap between the color filter 21' and the counter electrode substrate 211; a seal member (not shown) for sealing the periphery of the device; and a liquid crystal layer 205 provided in the gap. A polarizing plate (not shown) is provided outside each of the color filter 21' and the counter electrode substrate 211.

The color filter 21' constituting the liquid crystal display device 201 according to the present invention is the same as the above-described color filter 21 according to the present invention, except that the black matrix 23 is not provided. In the color filter 21' and the color filter 21, like members have the same reference numbers. Therefore, the color filter 21' even after impurity elution permits a liquid crystal to have a voltage holding ratio of not less than 90%, preferably not less than 95%. An aligning layer 206 is provided on the common transparent electrode layer 28 for the drive of the liquid crystal in the color filter 21'.

On the other hand, the counter electrode substrate 211 constituting the liquid crystal display device 201 according to the present invention comprises: a transparent substrate 212; a semiconductor drive element 220 provided on and integrally with the transparent substrate 212; a transparent pixel electrode 213; a resin light shielding layer 215 provided on the semiconductor drive element 220; and an aligning layer 216 provided so as to cover the transparent pixel electrode 213, the semiconductor drive element 220, and the resin light shielding layer 215.

The semiconductor drive element 220 is a thin film transistor (TFT) comprising a gate electrode 221, a gate insulating layer 222, a semiconductor layer 223, for example, formed of amorphous silicon, a source electrode 224, and a drain electrode 225. The drain electrode 225 in its one end is connected to the semiconductor layer 223, and the other end is connected to the transparent pixel electrode 213.

The resin light shielding layer 215 is provided on the source electrode 224 and the drain electrode 225 so as to function as a light shielding layer for the semiconductor layer 223 to suppress photo-leak current of the semiconductor drive element 220. This resin light shielding layer 215 is a resin member which, in the liquid crystal display device 201, is in contact with the liquid crystal layer 205 through the aligning layer 216. According to the present invention, the counter electrode substrate 211 even after impurity elution permits a liquid crystal to have a voltage holding ratio of not less than 90%, preferably not less than 95%.

The resin light shielding layer 215 constituting this counter electrode substrate 211 may be any one, and an example thereof is a resin light shielding layer formed by forming a photosensitive resin layer containing insulating light shielding particles of a composite oxide of Cu—Fe—Mn or the like and then pattering the photosensitive resin layer. In order to prevent the counter electrode substrate 211 from functioning as a source for impurities such as ionic materials and thus to enable the counter electrode substrate 211 after impurity elution to permit a liquid crystal to have a voltage holding ratio of not less than 90%, for example, the amount of the polymerization initiator used in the formation of the resin light shielding layer 215, post-baking conditions, and post-exposure after the completion of exposure for patterning are preferably regulated to enhance the degree of crosslinking of the resin.

The transparent substrate 212 constituting the counter electrode substrate 211 may be the above-described substrate 12 for the color filter.

The transparent pixel electrode 213 constituting the liquid crystal display device 201 may be formed by a conventional film forming method, such as sputtering, vacuum deposition, or CVD, for example, using indium tin oxide (ITO), zinc oxide (ZnO), tin oxide (SnO), or an alloy of metals constituting these oxides. The thickness of the transparent pixel electrode 213 and the thickness of the common transparent electrode layer 28 are about 0.01 to 1 $\mu$m which is not substantially expected to block impurities.

The aligning layers 206, 216 constituting the liquid crystal display device 201 may be formed of an organic compound, and examples of organic compounds usable herein include polyimide compounds, polyamide compounds, polyurethane compounds, and polyurea compounds. The thickness of the aligning layers 206, 216 may be about 0.01 to 1 $\mu$m. In these aligning layers 206, 216, after coating by various printing methods or conventional coating methods, baking is carried out followed by alignment (rubbing). Even when a polar solvent is used in the formation of the aligning layer, impurities such as ionic materials are hardly eluted into the liquid crystal layer, because the color filter 21' of the present invention is used in the liquid crystal display device 201 of the present invention and, in addition, as described above, the counter electrode substrate 211 after impurity elution permits a liquid crystal to have a voltage holding ratio of not less than 90%, preferably not less than 95%.

In the aligning layers 206, 216 formed of the above organic compound, the thickness is so small that there is no need to consider the migration of impurities causative of display failures into the liquid crystal layer 205. Further, these aligning layers 206, 216 are not substantially expected to block impurities.

The liquid crystal layer 205 constituting the liquid crystal display device 201 may be formed of a liquid crystal having a voltage holding ratio of not less than 95% as measured under the above-described conditions for the measurement of the voltage holding ratio.

In this liquid crystal display device 201 according to the present invention, the color filter 21' and the counter electrode substrate 211 even after impurity elution permit a liquid crystal to have a voltage holding ratio of not less than 90%, preferably not less than 95%. By virtue of this, the liquid crystal display device 201 can prevent the occurrence of display failures, such as sticking and uneven whiteness, even under severe display conditions, such as in the case of display for a long period of time or in the case of display under high temperature and high humidity conditions, and thus has excellent display quality.

In the liquid crystal display device 201, the color filter used is the color filter 21' not provided with the black matrix, according to the present invention. Alternatively, the above color filters 11, 11', 21, 31 according to the present invention may be used. Likewise, the use of the color filters 11, 11', 31, each having a construction such that the black matrix has been removed, according to the present invention can provide transmission liquid crystal display devices.

When the color filter 41 according to the present invention is used as the color filter, a reflection liquid crystal display device can be provided. In this case, a phase difference plate and a polarizing plate are provided outside the counter electrode substrate 211 on the viewer side.

Third Liquid Crystal Display Device According to Present Invention

Figure 8:
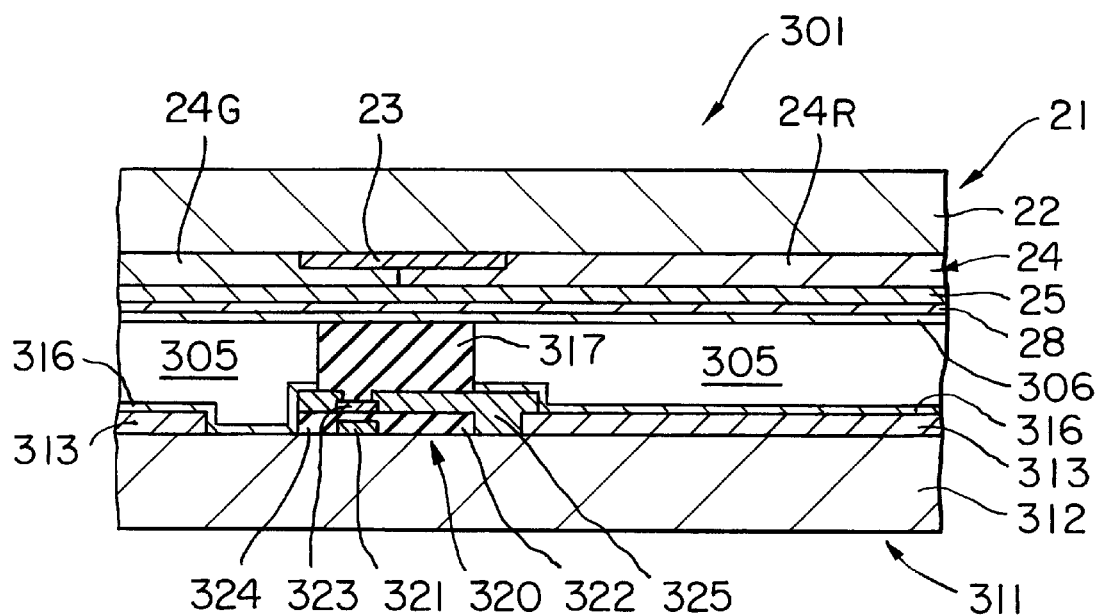
FIG. 8 is a schematic cross-sectional view showing still another embodiment of the liquid crystal display device according to the present invention.

FIG. 8 is a schematic cross-sectional view showing one embodiment of the third liquid crystal display device according to the present invention. In FIG. 8, a liquid crystal display device 301 is a transmission liquid crystal display device comprising: a color filter 21; a counter electrode substrate 311 provided so as to face the color filter 21 while leaving a predetermined gap between the color filter 21 and the counter electrode substrate 311; a seal member (not shown) for sealing the periphery of the device; and a liquid crystal layer 305 provided in the gap. A polarizing plate (not shown) is provided outside each of the color filter 21 and the counter electrode substrate 311.

The color filter 21 constituting the liquid crystal display device 301 according to the present invention is the same as the above-described color filter 21 according to the present invention. In the color filter 21 constituting the liquid crystal display device 301 according to the present invention and the color filter 21 according to the present invention, like members have the same reference numbers. Therefore, the color filter 21 even after impurity elution permits a liquid crystal to have a voltage holding ratio of not less than 90%, preferably not less than 95%. An aligning layer 306 is provided on the common transparent electrode layer 28 for the drive of the liquid crystal in the color filter 21.

On the other hand, the counter electrode substrate 311 constituting the liquid crystal display device 301 according to the present invention comprises: a transparent substrate 312; a semiconductor drive element 320 provided on and integrally with the transparent substrate 312; a transparent pixel electrode 313; a columnar convex 317 provided on the semiconductor drive element 320; and an aligning layer 316 provided so as to cover the transparent pixel electrode 313 and the semiconductor drive element 320.

The semiconductor drive element 320 has the same structure as the semiconductor drive element 220, and is a thin film transistor (TFT) comprising a gate electrode 321, a gate insulating layer 322, a semiconductor layer 323, for example, formed of amorphous silicon, a source electrode 324, and a drain electrode 325. The drain electrode 325 in its one end is connected to the semiconductor layer 323, and the other end is connected to the transparent pixel electrode 313.

The columnar convex 317 is provided on the semiconductor layer 323, the source electrode 324, and the drain electrode 325, and, when laminated onto the color filter 21, functions as a spacer. The columnar convex 317 has a given height of about 2 to 10 $\mu$m. The height of the columnar convex 317 may be properly determined, for example, from thickness required in the liquid crystal layer of the liquid crystal display device. Further, the formation density of the columnar convex 317 may be properly determined by taking into consideration, for example, the unevenness of thickness of the liquid crystal layer, the numerical aperture, the shape of the columnar convex 317, and the material. A necessary and sufficient spacer function can be developed, for example, by providing one columnar convex 317 for each set of the red pattern 24R, the green pattern 24G, and the blue pattern 24B constituting the colored layer 24 in the color filter 21. The shape of the columnar convex 317 is not particularly limited, and examples thereof include cylindrical, prismatical, and flat-head conical shapes. The columnar convex 317 may be formed using a resin material as described above in connection with the columnar convex 36 in the color filter 31.

According to the present invention, the counter electrode substrate 311, provided with the resin columnar convex 317, even after impurity elution, permits a liquid crystal to have a voltage holding ratio of not less than 90%, preferably not less than 95%. In order to prevent the counter electrode substrate 311 from functioning as a source for impurities such as ionic materials and thus to enable the counter electrode substrate 311 after impurity elution to permit a liquid crystal to have a voltage holding ratio of not less than 90%, for example, the amount of the polymerization initiator used in the formation of the columnar convex 317, postbaking conditions, and post-exposure after the completion of exposure for patterning are preferably regulated to enhance the degree of crosslinking of the resin.

The transparent substrate 312 constituting the counter electrode substrate 311 may be the above-described substrate 12 for the color filter.

The transparent pixel electrode 313 constituting the liquid crystal display device 301 may be formed by a conventional film forming method, such as sputtering, vacuum deposition, or CVD, for example, using indium tin oxide (ITO), zinc oxide (ZnO), tin oxide (SnO), or an alloy of metals constituting these oxides. The thickness of the transparent pixel electrode 313 and the thickness of the common transparent electrode layer 28 are about 0.01 to 1 $\mu$m which is not substantially expected to block impurities.

The aligning layers 306, 316 constituting the liquid crystal display device 301 may be the same as the aligning layers 206, 216 constituting the liquid crystal display device 201. Even when a polar solvent is used in the formation of the aligning layer, impurities such as ionic materials are hardly eluted into the liquid crystal layer, because the color filter 21 of the present invention is used in the liquid crystal display device 301 of the present invention and, in addition, as described above, the counter electrode substrate 311 after impurity elution permits a liquid crystal to have a voltage holding ratio of not less than 90%, preferably not less than 95%.

The liquid crystal layer 305 constituting the liquid crystal display device 301 may be formed of a liquid crystal having a voltage holding ratio of not less than 95% as measured under the above-described conditions for the measurement of the voltage holding ratio.

In this liquid crystal display device 301 according to the present invention, the color filter 21 and the counter electrode substrate 311 even after impurity elution permit a liquid crystal to have a voltage holding ratio of not less than 90%, preferably not less than 95%. By virtue of this, the liquid crystal display device 301 can prevent the occurrence of display failures, such as sticking and uneven whiteness, even under severe display conditions, such as in the case of display for a long period of time or in the case of display under high temperature and high humidity conditions, and thus has excellent display quality.

In the liquid crystal display device 301, the color filter used is the color filter 21 according to the present invention. Alternatively, the above color filters 11, 11' according to the present invention may be used. Likewise, the use of the color filters 11, 11', 21, each having a construction such that the black matrix has been removed, according to the present invention can provide transmission liquid crystal display devices.

When the color filter 41 according to the present invention is used as the color filter, a reflection liquid crystal display device can be provided. In this case, a phase difference plate and a polarizing plate are provided outside the counter electrode substrate 311 on the viewer side.

Fourth Liquid Crystal Display Device According to Present Invention

Figure 9:
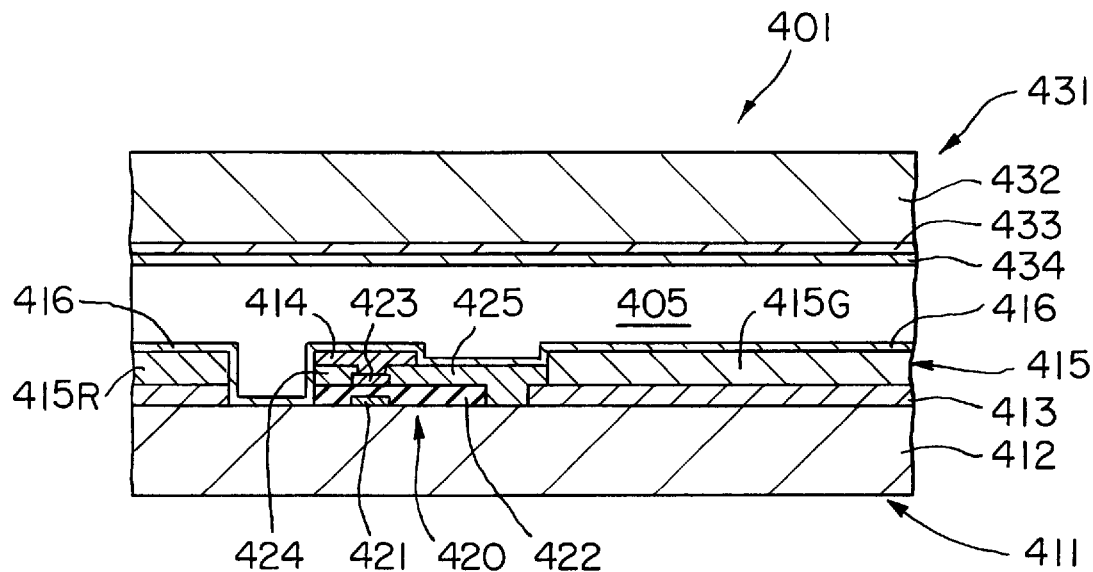
FIG. 9 is a schematic cross-sectional view showing a further embodiment of the liquid crystal display device according to the present invention.

FIG. 9 is a schematic cross-sectional view showing one embodiment of the fourth liquid crystal display device according to the present invention. In FIG. 9, a liquid crystal display device 401 is a transmission liquid crystal display device comprising: a counter electrode substrate 411; a common electrode substrate 431 provided so as to face the counter electrode substrate 411 while leaving a predetermined gap between the counter electrode substrate 411 and the common electrode substrate 431; a seal member (not shown) for sealing the periphery of the device; and a liquid crystal layer 405 provided in the gap. A polarizing plate (not shown) is provided outside each of the counter electrode substrate 411 and the common electrode substrate 431.

The counter electrode substrate 411 constituting the liquid crystal display device 401 according to the present invention comprises: a transparent substrate 412; a semiconductor drive element 420 provided on and integrally with the transparent substrate 412; a transparent pixel electrode 413; a resin light shielding layer 414 provided on the semiconductor drive element 420; a colored layer 415 provided on the transparent pixel electrode 413; and an aligning layer 416 provided so as to cover the transparent pixel electrode 413, the resin light shielding layer 414, the colored layer 415, and the semiconductor drive element 420.

The semiconductor drive element 420 has the same structure as the semiconductor drive element 220, and is a thin film transistor (TFT) comprising a gate electrode 421, a gate insulating layer 422, a semiconductor layer 423, for example, formed of amorphous silicon, a source electrode 424, and a drain electrode 425. The drain electrode 425 in its one end is connected to the semiconductor layer 423, and the other end is connected to the transparent pixel electrode 413.

The resin light shielding layer 414 is the same as the resin light shielding layer 215 in the liquid crystal display device 201, and is provided on the source electrode 424 and the drain electrode 425 so as to shield the semiconductor layer 423 from light. The resin light shielding layer 414 functions to suppress photo-leak current of the semiconductor drive element 420.

The colored layer 415 in the counter electrode substrate 411 is provided so as to cover each transparent pixel electrode 413, and comprises a red pattern 415R, a green pattern 415G, and a blue pattern (not shown) in a desired pattern form for each pixel electrode. The colored layer 415 may be formed by a pigment dispersion method using photosensitive resins respectively containing desired colorants, or by a conventional method such as printing or transfer. The colored layer 415 may be formed in such a manner that, for example, the thickness is increased in the order of the red pattern (smallest thickness), the green pattern, and the blue pattern (largest thickness). This permits the optimal liquid crystal layer thickness to be set for each color in the colored layer 415.

In the liquid crystal display device 401, the counter electrode substrate 411 even after impurity elution permits a liquid crystal to have a voltage holding ratio of not less than 90%, preferably not less than 95%. In order to prevent the counter electrode substrate 411 from functioning as a source for impurities such as ionic materials and thus to enable the counter electrode substrate 411 after impurity elution to permit a liquid crystal to have a voltage holding ratio of not less than 90%, for example, the amount of the polymerization initiator used in the formation of the resin light shielding layer 414 and the colored layer 415, post-baking conditions, and post-exposure after the completion of exposure for patterning are preferably regulated to enhance the degree of crosslinking of the resin.

The transparent substrate 412 constituting the counter electrode substrate 411 may be the above-described substrate 12 for the color filter.

The common electrode substrate 431 constituting the liquid crystal display device 401 according to the present invention comprises: a transparent substrate 432; and, provided on the transparent substrate 432, a common transparent electrode 433 and an aligning layer 434. The substrate 12 for a color filter described above may be used as the transparent substrate 432.

The transparent pixel electrode 413 and the common transparent electrode layer 433 constituting the liquid crystal display device 401 may be formed by a conventional film forming method, such as sputtering, vacuum deposition, or CVD, for example, using indium tin oxide (ITO), zinc oxide (ZnO), tin oxide (SnO), or an alloy of metals constituting these oxides. The thickness of the transparent pixel electrode 413 and the thickness of the common transparent electrode layer 433 are about 0.01 to 1 $\mu$m which cannot be substantially expected to block impurities.

The aligning layers 416, 434 constituting the liquid crystal display device 401 may be the same as the aligning layers 206, 216 constituting the liquid crystal display device 201. Even when a polar solvent is used in the formation of the aligning layer 416, impurities such as ionic materials are hardly eluted into the liquid crystal layer, because, in the liquid crystal display device 401 of the present invention, as described above, the counter electrode substrate 411 even after impurity elution permits a liquid crystal to have a voltage holding ratio of not less than 90%, preferably not less than 95%.

The liquid crystal layer 405 constituting the liquid crystal display device 401 may be formed of a liquid crystal having a voltage holding ratio of not less than 95% as measured under the above-described conditions for the measurement of the voltage holding ratio.

In this liquid crystal display device 401 according to the present invention, the counter electrode substrate 411 even after impurity elution permits a liquid crystal to have a voltage holding ratio of not less than 90%, preferably not less than 95%. By virtue of this, the liquid crystal display device 401 can prevent the occurrence of display failures, such as sticking and uneven whiteness, even under severe display conditions, such as in the case of display for a long period of time or in the case of display under high temperature and high humidity conditions, and thus has excellent display quality.

Fifth Liquid Crystal Display Device According to Present Invention

Figure 10:
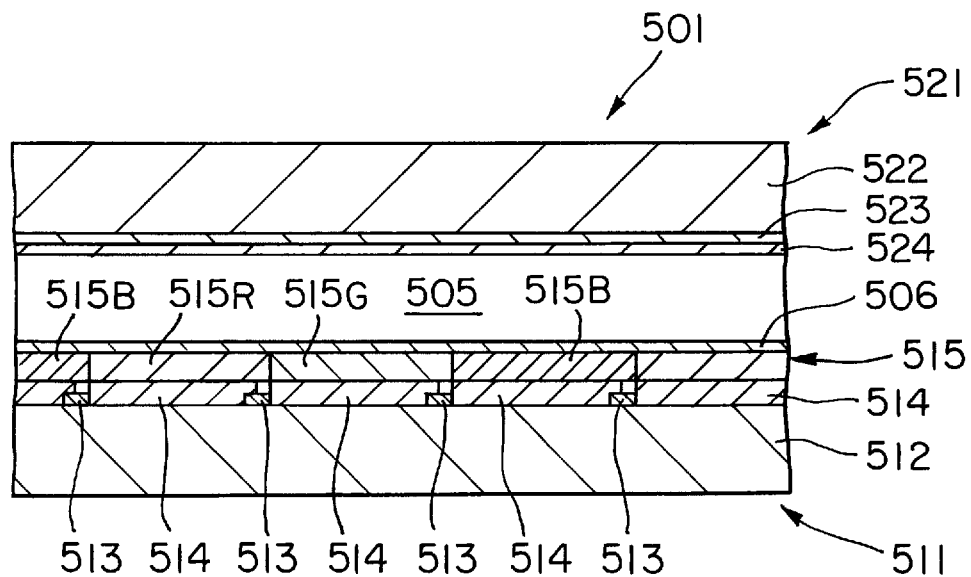
FIG. 10 is a schematic cross-sectional view showing a still further embodiment of the liquid crystal display device according to the present invention.

FIG. 10 is a schematic cross-sectional view showing one embodiment of the fifth liquid crystal display device according to the present invention. In FIG. 10, a liquid crystal display device 501 is a reflection liquid crystal display device comprising: a counter electrode substrate 511; a common electrode substrate 521 provided so as to face the counter electrode substrate 511 while leaving a predetermined gap between the counter electrode substrate 511 and the common electrode substrate 521; a seal member (not shown) for sealing the periphery of the device; and a liquid crystal layer 505 provided in the gap. A phase difference plate (not shown) and a polarizing plate (not shown) are provided outside the common electrode substrate 521 on the viewer side.

The counter electrode substrate 511 constituting the liquid crystal display device 501 according to the present invention comprises: a substrate 512, and, provided on the substrate 512, a plurality of thin film transistors (TFT) 513 constituting a liquid crystal drive element layer and a plurality of reflection pixel electrodes 514 constituting a reflection electrode layer. A colored layer 515 is provided so as to cover the reflection pixel electrodes 514. Further, an aligning layer 506 is provided so as to cover the reflection pixel electrodes 514 and the colored layer 515.

The reflection pixel electrodes 514 in the counter electrode substrate 511 may be formed by forming a thin layer of a metal, such as aluminum, by a conventional film forming method, such as vapor deposition or sputtering, and patterning the thin layer.

The colored layer 515 in the counter electrode substrate 511 is provided so as to cover each reflection pixel electrode 514, and comprises a red pattern 515R, a green pattern 515G, and a blue pattern 515B in a desired pattern form for each reflection pixel electrode. The colored layer 515 may be formed by a pigment dispersion method using photosensitive resins respectively containing desired colorants, or by a conventional method such as printing or transfer. The colored layer 515 may be formed in such a manner that, for example, the thickness is increased in the order of the red pattern (smallest thickness), the green pattern, and the blue pattern (largest thickness). This permits the optimal liquid crystal layer thickness to be set for each color in the colored layer 515.

In the liquid crystal display device 501, the counter electrode substrate 511 even after impurity elution permits a liquid crystal to have a voltage holding ratio of not less than 90%, preferably not less than 95%. In order to prevent the counter electrode substrate 511 from functioning as a source for impurities such as ionic materials and thus to enable the counter electrode substrate 511 after impurity elution to permit a liquid crystal to have a voltage holding ratio of not less than 90%, for example, the amount of the polymerization initiator used in the formation of the colored layer 515, post-baking conditions, and post-exposure after the completion of exposure for patterning are preferably regulated to enhance the degree of crosslinking of the resin.

The substrate 512 constituting the counter electrode substrate 511 may be the above-described substrate 12 for the color filter.

The common electrode substrate 521 constituting the liquid crystal display device 501 according to the present invention comprises: a transparent substrate 522; and, provided on the transparent substrate 522, a common transparent electrode layer 523 and an aligning layer 524. The substrate 12 for a color filter described above may be used as the transparent substrate 522. The common transparent electrode layer 523 may be formed by a conventional film forming method, such as sputtering, vacuum deposition, or CVD, for example, using indium tin oxide (ITO), zinc oxide (ZnO), tin oxide (SnO), or an alloy of metals constituting these oxides. The thickness of these electrode layers is about 0.01 to 1 $\mu$m which cannot be substantially expected to block impurities.

The aligning layers 506, 524 constituting the liquid crystal display device 501 may be the same as the aligning layers 206, 216 constituting the liquid crystal display device 201. Even when a polar solvent is used in the formation of the aligning layer 506, impurities such as ionic materials are hardly eluted into the liquid crystal layer, because, in the liquid crystal display device 501 of the present invention, as described above, the counter electrode substrate 511 even after impurity elution permits a liquid crystal to have a voltage holding ratio of not less than 90%, preferably not less than 95%.

The liquid crystal layer 505 constituting the liquid crystal display device 501 may be formed of a liquid crystal having a voltage holding ratio of not less than 95% as measured under the above-described conditions for the measurement of the voltage holding ratio.

In this liquid crystal display device 501 according to the present invention, the counter electrode substrate 511 even after impurity elution permits a liquid crystal to have a voltage holding ratio of not less than 90%, preferably not less than 95%. By virtue of this, the liquid crystal display device 501 can prevent the occurrence of display failures, such as sticking and uneven whiteness, even under severe display conditions, such as in the case of display for a long period of time or in the case of display under high temperature and high humidity conditions, and thus has excellent display quality.

EXAMPLES

The present invention will be described in more detail with reference to the following examples.

Preparation of Color Filters (1) Color Filter Sample 1

A glass substrate having a size of 100 mm×100 mm and a thickness of 0.7 mm (7059 glass, manufactured by Corning) was provided as a substrate for a color filter. This substrate was cleaned according to a conventional method. A photosensitive coating composition for a black matrix was coated on the whole area of one side of the substrate. The coating was then prebaked at 90° C. for 3 min, subjected to exposure (through) mask at 500 mJ/cm$^2$, subjected to spray development with a 0.05% aqueous KOH solution, and then post-baked at 200° C. for 30 min to form a 1.2 $\mu$m-thick black matrix.

The photosensitive coating composition for a black matrix was prepared as follows. Beads were added to a composition in a dispersion form (containing a pigment, a dispersant, and a solvent). The mixture was dispersed by means of a dispergator for 3 hr, and the beads were then removed therefrom to prepare a dispersion. The dispersion was mixed with a clear resist composition (containing a polymer, a monomer, an additive, an initiator, and a solvent) to prepare the photosensitive coating composition for a black matrix which had the following formulation. A paint shaker was used as the dispergator.

| (Photosensitive coating composition for black matrix) | |
|---|---|
| Black pigment (TM Black #9550, manufactured by Dainichiseika Color & Chemicals Manufacturing Co., Ltd.) | 14.0 pts. wt. |
| Dispersant (Disperbyk 111, manufactured by Bik-Chemie) | 1.2 pts. wt. |
| Polymer (VR60, manufactured by Showa High Polymer Co., Ltd.) | 2.8 pts. wt. |
| Monomer (SR399, manufactured by Sartomer) | 3.5 pts. wt. |
| Additive (L-20, manufactured by Soken Chemical Engineering Co., Ltd.) | 0.7 pt. wt. |
| Initiator (2-benzyl-2-dimethylamino-1-(4-morpholinophenyl)-butanone-1) | 1.6 pts. wt. |
| Initiator (4,4'-diethylamino-benzophenone) | 0.3 pt. wt. |
| Initiator (2,4-diethylthioxanthone) | 0.1 pt. wt. |
| Solvent (ethylene glycol monobutyl ether) | 75.8 pts. wt. |

Next, three photosensitive coating compositions R1, G1, and B1 having the following respective formulations for a colored layer were used to form a colored layer. Specifically, a photosensitive coating composition R1 for a red pattern was spin coated on the whole area of the substrate with a black matrix formed thereon. Thus, a photosensitive resin layer for red was formed, and was then prebaked at 90° C. for 3 min. Thereafter, the photosensitive resin layer for red was subjected to alignment exposure using a photomask for a predetermined color pattern, followed by development with a developing solution (a 0.05% aqueous KOH solution)

and then post-baking at 230° C. for 30 min to form a red pattern (thickness: 1.2 μm) at predetermined positions relative to the black matrix pattern.

A green pattern (thickness: 1.2 μm) was formed at predetermined positions relative to the black matrix pattern in the same manner as used in the formation of the red pattern, except that the photosensitive coating composition G1 for a green pattern was used. Further, a blue pattern (thickness: 1.2 μm) was formed at predetermined positions relative to the black matrix pattern in the same manner as used in the formation of the red pattern, except that the photosensitive coating composition B1 for a blue pattern was used.

A common transparent electrode layer of indium tin oxide (ITO) was then formed on the colored layer. Thus, a color filter (sample 1) having a structure as shown in FIG. 1 was prepared.

The photosensitive coating composition R1, G1, and B1 for respective color patterns in the colored layer were prepared as follows. Beads were added to a composition in a dispersion form (containing a pigment, a dispersant, and a solvent). The mixture was dispersed by means of a dispergator for 3 hr, and the beads were then removed therefrom to prepare a dispersion. The dispersion was mixed with a clear resist composition (containing a polymer, a monomer, an additive, an initiator, and a solvent). The photosensitive coating compositions had the following formulations. A paint shaker was used as the dispergator.

| (Photosensitive coating composition R1 for red pattern) | |
|---|---|
| Red pigment (Cromophtal Red A2B, manufactured by Ciba-Geigy) | 4.8 pts. wt. |
| Yellow pigment (Paliotol Yellow D1819, manufactured by BASF) | 1.2 pts. wt. |
| Dispersant (Solsperse 24000, manufactured by Zeneca Co., Ltd.) | 3.0 pts. wt. |
| Monomer (SR399, manufactured by Sartomer) | 4.0 pts. wt. |
| Polymer 1 | 5.0 pts. wt. |
| Initiator (Irgacure 907, manufactured by Ciba-Geigy) | 1.4 pts. wt. |
| Initiator (2,2'-bis(o-chloro-phenyl)-4,5,4',5'-tetraphenyl-1,2'-biimidazole) | 0.6 pt. wt. |
| Solvent (propylene glycol monomethyl ether acetate) | 80.0 pts. wt. |

| (Photosensitive coating composition G1 for green pattern) | |
|---|---|
| Green pigment (Monastral Green 9Y-C, manufactured by Zeneca Co., Ltd.) | 4.2 pts. wt. |
| Yellow pigment (Paliotol Yellow D1819, manufactured by BASF) | 1.8 pts. wt. |
| Dispersant (Soisperse 24000, manufactured by Zeneca Co., Ltd.) | 3.0 pts. wt. |
| Monomer (SR399, manufactured by Sartomer) | 4.0 pts. wt. |
| Polymer 1 | 5.0 pts. wt. |
| Initiator (Irgacure 907, manufactured by Ciba-Geigy) | 1.4 pts. wt. |
| Initiator (2,2'-bis(o-chloro-phenyl)-4,5,4', 5'-tetraphenyl-1,2'-biimidazole) | 0.6 pt. wt. |
| Solvent (propylene glycol monomethyl ether acetate) | 80.0 pts. wt. |

| (Photosensitive coating composition B1 for blue pattern) | |
|---|---|
| Blue pigment (Heliogen Blue L6700F, manufactured by BASF) | 6.0 pts. wt. |
| Pigment derivative (Soisperse 12000, manufactured by Zeneca Co., Ltd.) | 0.6 pt. wt. |
| Dispersant (Solsperse 24000, manufactured by Zeneca Co., Ltd.) | 2.4 pts. wt. |
| Monomer (SR399, manufactured by Sartomer) | 4.0 pts. wt. |
| Polymer 1 | 5.0 pts. wt. |
| Initiator (Irgacure 907, manufactured by Ciba-Geigy) | 1.4 pts. wt. |
| Initiator (2,2'-bis(o-chloro-phenyl)-4,5,4',5'-tetraphenyl-1,2'-biimidazole) | 0.6 pt. wt. |
| Solvent (propylene glycol monomethyl ether acetate) | 80.0 pts. wt. |

The polymer 1 was prepared by adding 16.9% by mole of 2-methacryloyloxyethyl isocyanate to 100% by mole of a copolymer of benzyl methacrylate:styrene:acrylic acid:2-hydroxyethyl methacrylate=15.6:37.0:30.5:16.9 (molar ratio), and had a weight average molecular weight of 42500. The same is true of the polymer 1 used in the following other photosensitive coating compositions.

(2) Color Filter Sample 2

A color filter (sample 2) was prepared in the same manner as used in the preparation of the sample 1, except that the following photosensitive coating composition G2 for a green pattern was used as the photosensitive coating composition for a green pattern instead of the photosensitive coating composition G1.

The photosensitive coating composition G2 for a green pattern was prepared in the same manner as used in the preparation of the above photosensitive coating composition. The formulation of the photosensitive coating composition G2 was as follows.

| (Photosensitive coating composition G2 for green pattern) | |
|---|---|
| Green pigment (Monastral Green 6Y-CL, manufactured by Zeneca Co., Ltd.) | 4.2 pts. wt. |
| Yellow pigment (Paliotol Yellow D1819, manufactured by BASF) | 1.8 pts. wt. |
| Dispersant (Solsperse 24000, manufactured by Zeneca Co., Ltd.) | 3.0 pts. wt. |
| Monomer (SR399, manufactured by Sartomer) | 4.0 pts. wt. |
| Polymer 1 | 5.0 pts. wt. |
| Initiator (Irgacure 907, manufactured by Ciba-Geigy) | 1.4 pts. wt. |
| Initiator (2,2'-bis(o-chloro-phenyl)-4,5,4',5'-tetraphenyl-1,2'-biimidazole) | 0.6 pt. wt. |
| Solvent (propylene glycol monomethyl ether acetate) | 80.0 pts. wt. |

(3) Color Filter Sample 3

A color filter (sample 3) was prepared in the same manner as used in the preparation of the sample 1, except that, in the step of forming the colored layer, the post-baking was carried out at 200° C. for 30 min.

(4) Color Filter Sample 4

A color filter (sample 4) was prepared in the same manner as used in the preparation of the sample 2, except that, in the step of forming the colored layer, the post-baking was carried out at 200° C. for 30 min.

(5) Color Filter Sample 5

At the outset, a black matrix and a colored layer are formed in the same manner as used in the preparation of the sample 2. A coating composition having the following formulation for a protective layer was then spin coated so as to cover the black matrix and the colored layer. The coating was prebaked at 90° C. for 3 min. The prebaked coating was then subjected to alignment exposure using a predetermined pattern mask for a protective layer, followed by development with a developing solution (a 0.05% aqueous KOH solution) and then post-baking at 230° C. for 30 min to form a 1.5 μm-thick protective layer. Thereafter, a common transparent electrode layer of indium tin oxide (ITO) was formed on the protective layer. Thus, a color filter (sample 5) having a structure as shown in FIG. 3 was prepared.

| (Coating composition for protective layer) | |
|---|---|
| Monomer (SR399, manufactured by Sartomer) | 7.1 pts. wt. |
| Polymer 1 | 8.8 pts. wt. |
| Epoxy resin (Epikote 180 S70, manufactured by Yuka Shell Epoxy K.K.) | 9.7 pts. wt. |
| Initiator (Irgacure 907, manufactured by Ciba-Geigy) | 1.4 pts. wt. |
| Initiator (2,2'-bis(o-chloro-phenyl)-4,5,4',5'-tetraphenyl-1,2'-biimidazole) | 1.0 pt. wt. |
| Solvent (dimethyl diglycol) | 38.0 pts. wt. |
| Solvent (3-methoxybutyl acetate) | 34.0 pts. wt. |

(6) Color Filter Sample 6

The procedure used in the preparation of the sample 5 was repeated up to the step at which the protective layer was formed. A photosensitive coating composition S1 having the following formulation for columnar convexes was spin coated on a glass substrate so as to cover the protective layer. The coating was prebaked at 100° C. for 3 min. Thereafter, the prebaked coating was subjected to mask exposure, subjected to spray development with a 0.01% aqueous KOH solution, and then post-baked at 200° C. for 30 min. Thus, a plurality of columnar convexes with a height of 5 μm were formed. Next, a common transparent electrode layer of indium tin oxide (ITO) was formed on the protective layer. Thus, a color filter (sample 6) having a structure as shown in FIG. 4 was prepared.

| (Photosensitive coating composition S1 for columnar convexes) | |
|---|---|
| Monomer (SR3 99, manufactured by Sartomer) | 8.7 pts. wt. |
| Polymer 1 | 10.9 pts. wt. |
| Epoxy resin (Epikote 180 S70, manufactured by Yuka Shell Epoxy K.K.) | 12.1 pts. wt. |
| Surfactant (Nonion HS-2 10, manufactured by Nippon Oils & Fats Co., Ltd.) | 1.0 pt. wt. |
| Initiator (Irgacure 369, manufactured by Ciba-Geigy) | 1.2 pts. wt. |
| Initiator (2,2'-bis(o-chloro-phenyl)-4,5,4',5'-tetraphenyl-1,2'-biimidazole) | 1.0 pt. wt. |
| Solvent (propylene glycol monomethyl ether acetate) | 29.1 pts. wt. |
| Solvent (3-methoxybutyl acetate) | 36.0 pts. wt. |

(7) Color Filter Sample 7

A color filter (sample 7) was prepared in the same manner as used in the preparation of the sample 6, except that a photosensitive coating composition S2 having the following formulation was used as the photosensitive coating composition for columnar convexes instead of the photosensitive coating composition S1.

| (Photosensitive coating composition S2 for columnar convexes) | |
|---|---|
| Monomer (SR399, manufactured by Sartomer) | 8.7 pts. wt. |
| Polymer 1 | 10.9 pts. wt. |
| Epoxy resin (Epikote 180 S70, manufactured by Yuka Shell Epoxy K.K.) | 12.1 pts. wt. |
| Surfactant (Nonion HS-210, manufactured by Nippon Oils & Fats Co., Ltd.) | 2.0 pts. wt. |
| Initiator (Irgacure 369, manufactured by Ciba-Geigy) | 1.2 pts. wt. |
| Initiator (2,2'-bis(o-chloro-phenyl)-4,5,4',5'-tetraphenyl-1,2'-biimidazole) | 1.0 pt. wt. |
| Solvent (propylene glycol monomethyl ether acetate) | 28.1 pts. wt. |
| Solvent (3-methoxybutyl acetate) | 36.0 pts. wt. |

Impurity Elution

N-Methylpyrrolidone (NMP) was spin coated as a polar solvent at a coverage of 0.01 mg/cm$^2$ on the common transparent electrode layer in each of the color filters (samples 1 to 7). The coated color filters were then heated at 40 to 250° C. to evaporate NMP.

Measurement of Voltage Holding Ratio

Measurement cells having a layer construction of color filter/liquid crystal/electrode/substrate were prepared using the color filters (samples 1 to 7) subjected to the impurity elution. A liquid crystal (DP-500 2LA, manufactured by Chisso Corp.) was poured into the measurement cells, followed by the measurement of the voltage holding ratio under the following conditions. The results were as shown in Table 1 below. The liquid crystal, when poured into a measurement cell having a layer construction of substrate/electrode/liquid crystal/electrode/substrate, had a voltage holding ratio of not less than 98% as measured under the following conditions.

Electrode-electrode distance: 5 to 15 μm

Pulse amplitude of applied voltage: 5 V

Pulse frequency of applied voltage: 60 Hz

Pulse width of applied voltage: 16.67 msec

Preparation of Liquid Crystal Display Device

A glass substrate having a size of 100 mm×100 mm and a thickness of 0.7 mm (7059 glass, manufactured by Corning) was provided as a transparent substrate. This substrate was cleaned according to a conventional method. Thereafter, a thin film transistor (TFT) was formed on the substrate at its plurality of predetermined sites. A transparent pixel electrode of indium tin oxide (ITO) was formed so as to be connected to each TFT in its drain electrode. Thus, a counter electrode substrate was prepared.

Next, a polyimide resin coating composition (SE-7492, manufactured by Nissan Chemical Industries Ltd.) was coated so as to cover the common transparent electrode layer in the color filters (samples 1 to 7) and the transparent pixel electrode in the counter electrode substrate, and the coating was then dried to form an alignment layer (thickness: 0.07 μm), followed by aligning treatment.

Liquid crystal display devices (samples 1 to 7) were then prepared using these color filters and the counter electrode substrate. In this case, DP-500 2LA manufactured by Chisso Corp. was used as a liquid crystal.

Evaluation of Liquid Crystal Display Devices

For the seven liquid crystal display devices (samples 1 to 7) thus prepared, image display was continuously carried out at 25° C. for 10 hr, and the display quality was evaluated according to the following criteria. The results are shown in Table 1 below.

Evaluation Criteria of Display Quality

○: Neither sticking nor uneven whiteness occurred, that is, the display quality was very good.

×: Sticking and uneven whiteness occurred, that is, display failure phenomena were observed.

TABLE 1

| Color filter (liquid crystal display device) | Voltage holding ratio, % | Construction of color filter | | | | | | |
|---|---|---|---|---|---|---|---|---|
| | | Black matrix | Coating composition for colored layer | | | Protective layer | Coating composition for columnar convex | Quality of display |
| | | | Red | Green | Blue | | | |
| Sample 1 | 95 | Provided | R1 | G1 | B1 | Not provided | — | ○ |
| Sample 2 | 90 | Provided | R1 | G2 | B1 | Not provided | — | ○ |
| Sample 3 | 80 | Provided | R1 | G1 | B1 | Not provided | — | X |
| Sample 4 | 70 | Provided | R1 | G2 | B1 | Not provided | — | X |
| Sample 5 | 95 | Provided | R1 | G1 | B1 | Provided | — | ○ |
| Sample 6 | 95 | Provided | R1 | G1 | B1 | Provided | S1 | ○ |
| Sample 7 | 80 | Provided | R1 | G1 | B1 | Provided | S2 | X |

As is apparent from Table 1, the liquid crystal display devices using color filters (samples 1, 2, 5, and 6), which, after impurity elution, permit a liquid crystal to have a voltage holding ratio of not less than 90%, did not cause any display failure phenomena in display for a long period of time under high temperature and high humidity conditions.

By contrast, for the liquid crystal display devices using color filters (samples 3, 4, and 7), which, after impurity elution, permit a liquid crystal to have a voltage holding ratio of less than 90%, sticking and uneven whiteness occurred, that is, display failure phenomena were observed.

As is apparent from the foregoing detailed description, after impurity elution, the color filter according to the present invention can permit a liquid crystal to maintain a voltage holding ratio of not less than 90%. Therefore, the liquid crystal display device using this color filter according to the present invention can prevent the occurrence of display failures, such as sticking and uneven whiteness, and can realize excellent display quality, even under severe display conditions, for example, in the case of display for a long period of time or in the case of display under high temperature and high humidity conditions. Further, also in the liquid crystal display device according to the present invention, which is not provided with the color filter according to the present invention and has a color filer layer in a counter electrode substrate, the counter electrode substrate after impurity elution can permit a liquid crystal to maintain a voltage holding ratio of not less than 90%. Therefore, the liquid crystal display device can prevent the occurrence of display failures, such as sticking and uneven whiteness, and can realize excellent display quality, even under severe display conditions, for example, in the case of display for a long period of time or in the case of display under high temperature and high humidity conditions.

What is claimed is:

1. A color filter comprising at least a substrate and a colored layer of a plurality of colors provided in a predetermined pattern on the substrate, wherein, after impurity elution, the color filter permits a liquid crystal to have a voltage holding ratio of not less than 90%.

2. The color filter according to claim 1, which further comprises a light shielding layer provided in a predetermined pattern.

3. The color filter according to claim 1, which further comprises a transparent protective layer provided on the colored layer so as to cover at least the colored layer.

4. The color filter according to claim 3, which further comprises a transparent columnar convex which are provided in a plurality of predetermined sites on the substrate and is protruded from the transparent protective layer.

5. The color filter according to claim 1, wherein a reflective layer is provided between the substrate and the colored layer.

6. A liquid crystal display device comprising: a color filter;
 a counter electrode substrate provided so as to face the color filter while leaving a gap between the color filter and the counter electrode substrate through a seal member; and
 a liquid crystal layer sealed into the gap, said color filter comprising a common transparent electrode layer provided in the color filter according to claim 1.

7. A liquid crystal display device comprising: a color filter;
 a counter electrode substrate provided so as to face the color filter while leaving a gap between the color filter and the counter electrode substrate through a seal member; and
 a liquid crystal layer sealed into the gap, said color filter comprising a common transparent electrode layer provided in the color filter according to claim 1, said counter electrode substrate being such that a semiconductor drive element having a resin light shielding layer is provided and, after impurity elution, the counter electrode substrate permits a liquid crystal to have a voltage holding ratio of not less than 90%.

8. A liquid crystal display device comprising: a color filter;
 a counter electrode substrate provided so as to face the color filter while leaving a gap between the color filter and the counter electrode substrate through a seal member; and a liquid crystal layer sealed into the gap, said color filter comprising a common transparent electrode layer provided in the color filter according to claim 1, said counter electrode substrate being such that a semiconductor drive element having columnar convexes is provided and, after impurity elution, the counter electrode substrate permits a liquid crystal to have a voltage holding ratio of not less than 90%.

9. A liquid crystal display device comprising:

a common electrode substrate;

a counter electrode substrate provided so as to face the common electrode substrate while leaving a gap between the common electrode substrate and the counter electrode substrate through a seal member; and a liquid crystal layer sealed into the gap, wherein
   said common electrode substrate comprises a substrate and a common transparent electrode layer provided on the substrate, and
   said counter electrode substrate comprises semiconductor drive elements and a colored layer of a plurality of colors provided in a predetermined pattern according to the semiconductor drive elements, and, after impurity elution, permits a liquid crystal to have a voltage holding ratio of not less than 90%.

10. A liquid crystal display device comprising:

a common electrode substrate;

a counter electrode substrate provided so as to face the common electrode substrate while leaving a gap between the common electrode substrate and the counter electrode substrate through a seal member; and a liquid crystal layer sealed into the gap, wherein
   said common electrode substrate comprises a substrate and a common transparent electrode layer provided on the substrate, and
   said counter electrode substrate comprises a substrate and, provided on the substrate in the following order, a drive element layer, a reflective electrode layer, and a colored layer of a plurality of colors, and, after impurity elution, permits a liquid crystal to have a voltage holding ratio of not less than 90%.

* * * * *